United States Patent [19]

Orlich

[11] Patent Number: 5,560,696
[45] Date of Patent: Oct. 1, 1996

[54] METHOD AND APPARATUS FOR ESTABLISHING AN ALIGNMENT GRID OR PATTERN

[76] Inventor: William N. Orlich, 103 No. 3, Hogan Ct., Walnut Creek, Calif. 94598

[21] Appl. No.: 524,626

[22] Filed: Sep. 7, 1995

Related U.S. Application Data

[63] Continuation-in-part of Ser. No. 418,677, Apr. 7, 1995, Pat. No. 5,506,640.

[51] Int. Cl.⁶ .................................................. G03B 21/00
[52] U.S. Cl. .................................................. 353/28; 353/62
[58] Field of Search ........................... 353/28, 30, 40, 353/44, 62; 362/33, 97, 98, 800; 354/77

[56] References Cited

U.S. PATENT DOCUMENTS

| | | | |
|---|---|---|---|
| 3,323,415 | 6/1967 | Tobias | 353/28 |
| 3,749,485 | 7/1973 | Carter et al. | 353/98 |
| 3,807,846 | 4/1974 | Swank | 353/40 |
| 4,739,487 | 4/1988 | Bonnet et al. | 353/28 |
| 4,910,541 | 3/1990 | Morgan | 353/28 |
| 5,153,386 | 10/1992 | Siefer et al. | 362/33 |
| 5,477,283 | 12/1995 | Casey | 353/62 |

*Primary Examiner*—William C. Dowling
*Attorney, Agent, or Firm*—Shlesinger Arkwright & Garvey

[57] ABSTRACT

A light board includes a translucent support defining a support surface thereon, and an alignment pattern generator is located adjacent the support for establishing an alignment pattern. The alignment pattern generator includes a number of light-emitting elements. A photo duplicating device may be provided for duplicating a layout aligned on the alignment patter. The light board may be incorporated into a "photocopy machine." The light board may likewise be used as a light table, and the like.

21 Claims, 3 Drawing Sheets

METHOD AND APPARATUS FOR ESTABLISHING AN ALIGNMENT GRID OR PATTERN

CROSS-REFERENCE TO RELATED APPLICATIONS

This application is a continuation-in-part of application Ser. No. 08/418,677, entitled, "Method and Apparatus for an Alignment Grid or Pattern Projection System", filed Apr. 7, 1995, now U.S. Pat. No. 5,506,640 and which is incorporated herein by reference.

FIELD OF THE INVENTION

The present invention relates generally to a method of and device for aligning a layout which may be subsequently compared or duplicated using duplicating equipment, printing equipment or the like, and more specifically, to a method of and device for establishing an alignment pattern on a copy board for quick and accurate alignment of the components of a layout and for alignment of the layout with respect to the duplicating medium and for duplicating the image of the layout.

BACKGROUND OF THE INVENTION

In the graphic art business, the proper alignment of a layout to be duplicated or otherwise reproduced is very important. Any misalignment of the components of the layout with respect to the orientation of the film or the photographic medium (usually a film cartridge or plate) will be ultimately repeated on all copies made.

When the components of the layout are not properly aligned, a time consuming re-shoot or alignment on the printing machine may be required to correct the misalignment. This results in higher labor cost as well as wasted film and other materials.

There are a number of alignment devices commercially available, some examples of which are disclosed in U.S. Pat. Nos. 2,682,463 (Olsen) and 3,605,622 (Zarip). Many of the commercially available alignment devices rely on some form of pattern incorporated into or on the surface of the copy board. When the layout is placed on the copy board, the alignment pattern on the copy board is covered up, forcing the operator to guess or eyeball the proper alignment of the layout. These types of alignment devices can only ensure the proper alignment of the outer edges of a layout.

The present available technique for correcting the misalignment of an image on a developed plate (where the entire image of the layout is askew) is to adjust the plate containing the image of the layout on the press and run a test printing or a series of tests until proper alignment is achieved. This trial and error procedure is very time consuming and costly to the printer.

OBJECTS AND SUMMARY OF THE INVENTION

It is therefore an object of the present invention to provide an alignment and photo duplicating device for the quick and accurate alignment of an entire layout and its components relative to each other and to the photographic medium, thereby eliminating extensive reproduction time and costs previously required to achieve an accurate photo duplication or reproduction of a layout.

It is another object of the present invention to provide an alignment and photo duplicating device whereby the alignment pattern is unobstructed when objects or layouts are placed onto the copy boards.

It is yet another object of the present invention to provide an alignment device which establishes an image of an alignment pattern utilizing wave energy, such as visible light, ultraviolet light, and infra-red light, established within and/or projected onto a copy board.

It is still another object of the present invention to provide an alignment apparatus which utilizes a pattern generator allowing the user to select from multiple alignment patterns.

It is yet another object of the present invention to provide an alignment device removably associated with a vertical duplicating camera.

It is another object of the present invention to provide an alignment device which is operably interconnected with a photo duplicating device whereby the alignment pattern established on the copy board by the alignment device is automatically removed or cutoff prior to the activation of the duplicating device.

It is still another object of the present invention to provide an alignment device which is operably interconnected with a photo duplicating device so that the device automatically cycles on and off in a preselected time pattern, permitting the operator to view the layout with and without the alignment pattern projected onto the copy board.

It is another object of the present invention to provide an alignment device and photo duplicating device with a safety fail-safe apparatus which prevents the activation of the photo duplicating device without the removal of the alignment image.

It is yet another object of the present invention to provide an alignment device associated with a horizontal camera using a rotatable copy board.

It is another object of the present invention to provide an alignment device with alignment patterns using color schemes to enable a user to quickly position items with respect to other items with respect to the size of a layout using the color coded pattern.

It is another object of the present invention to provide an alignment device which can be operably attached to or connected with various types of photographic equipment.

It is yet another object of the present invention to provide an alignment device in which the intensity of the established alignment image can be varied.

It is still another object of the present invention to provide an alignment device which establishes an alignment image within a copy board that can be used in conjunction with a projection alignment device that projects an alignment image onto one or both of the copy board and an item disposed on the copy board.

In summary, the present invention is directed to a method of and apparatus for establishing an alignment grid on a copy board for the proper alignment of the components layout.

In summary, the present invention is directed to a method of and apparatus for establishing an alignment grid on a copy board for the proper alignment of the components layout and for duplicating the image of the layout.

Relative terms such as left and right are for convenience and are not intended to be limiting. The term "copy board" includes subject holders, and the like.

DETAILED DESCRIPTION OF THE INVENTION

FIGS. 1–3

Figure 1:
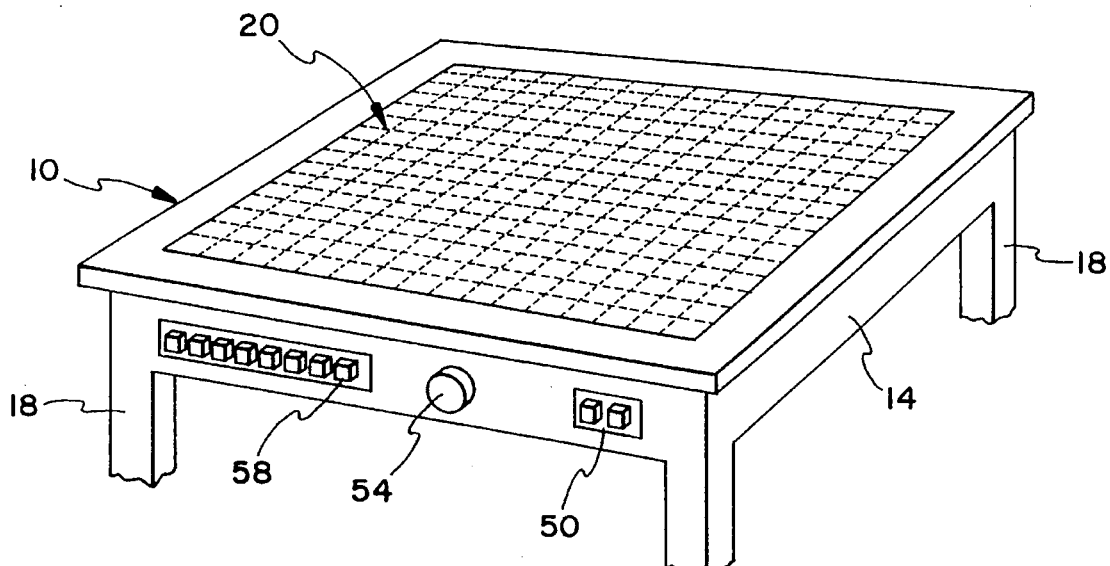
FIG. 1 is a perspective view of a table incorporating a light board according to a preferred embodiment of the invention.

FIG. 1 illustrates a preferred embodiment of a light board 10 in the form of a table 14, according to the invention.

Table 14 may be provided with legs 18, depending on the intended use.

Light board 10 includes an alignment pattern 20 having a first plurality 24 of light-emitting elements and a second plurality 28 of light-emitting elements.

Figure 3:
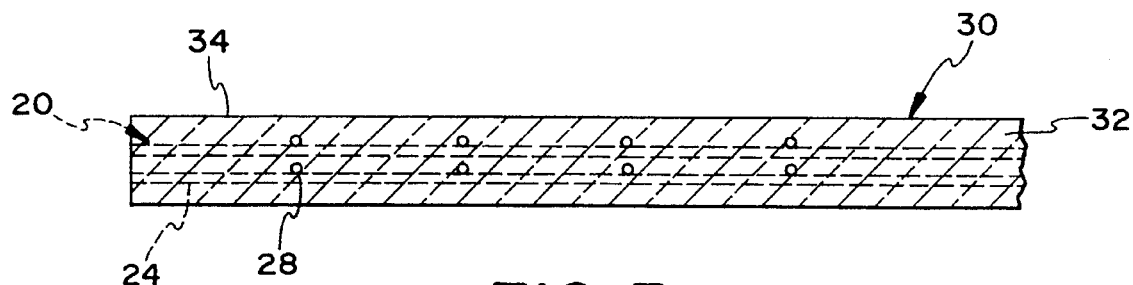
FIG. 3 is a elevational view of a translucent support according to the invention, taken along line 3—3 of FIG. 2.
Figure 2:
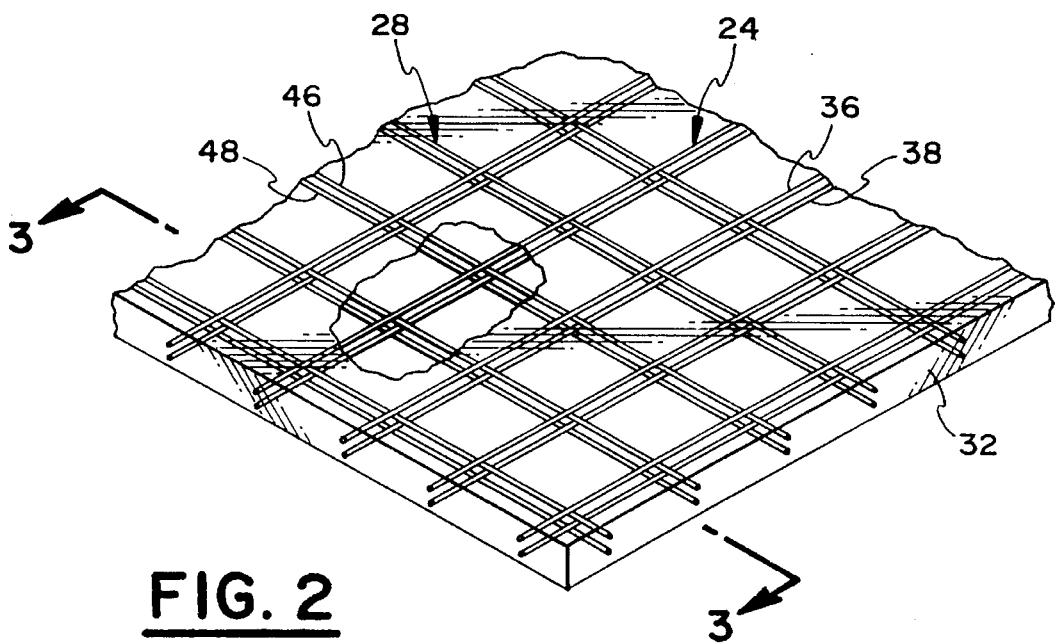
FIG. 2 is a perspective view of a translucent support for use with a light board according to the invention.

FIGS. 2 and 3 show a preferred embodiment of a support 30, preferably made of a translucent substrate 32. Support 30 defines an upper support surface 34 on which items, such as layouts to be aligned, may be placed, as will be described in detail below.

Support 30 is suited for use with the light board 10 of FIG. 1, as well as with the other preferred embodiments of the invention.

First plurality of light-emitting elements 24 may include an upper light-emitting element 36 and a lower light-emitting element 38. Likewise, second plurality of light-emitting elements 28 may include an upper light-emitting element 46 and a lower light-emitting element 48. The first and second pluralities of elements 36 and 38 may comprise cooperating units which emit light simultaneously, or independently, dependent on the effect and/or intensity desired. Such units may be arrayed or stacked above-and-below or side-by-side, for example.

Conveniently, light board 10 may be provided with an on/off switch 50. A further switch 54 for varying the intensity of one or both of first and second pluralities of light-emitting elements 24 and 28 may be provided. One or more switches 58 may be provided for activating a preselected number of light-emitting elements 24 and 28, and/or a pre-determined pattern of lighted light-emitting elements 24 and 28.

FIG. 4

Figure 4:
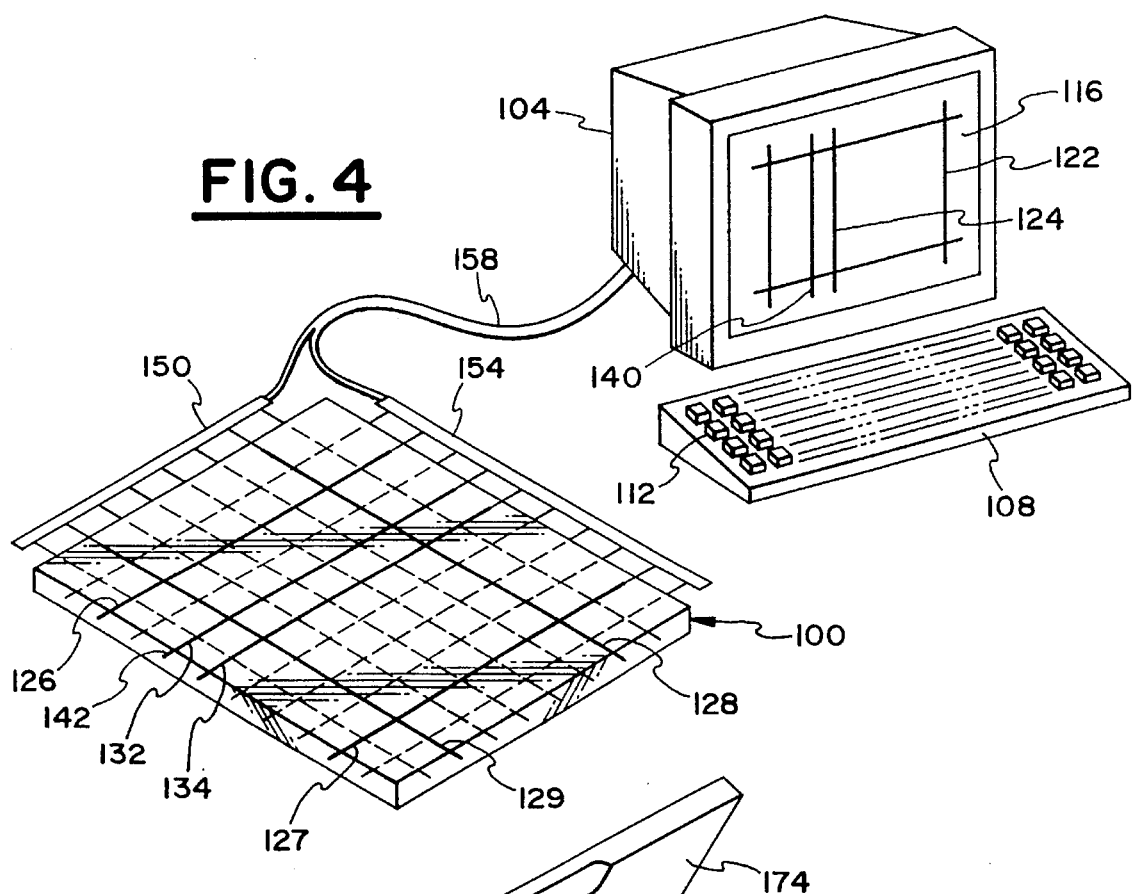
FIG. 4 is a perspective view of a further preferred embodiment of a computer-controlled light board according to the invention.

Turning to FIG. 4, another preferred embodiment of a light board 100 according to the invention will be described.

Light board 100 is controlled by a computer 104 having a data input device, such as a conventional keyboard 108 having a plurality of data entry keys 112.

Computer 104 has, a screen 116 on which a sample first alignment pattern 122 and a second alignment pattern 124 are illustrated.

First alignment pattern 122 is "generated" by energizing a first elongated light-emitting element 126, a second elongated light-emitting element 127, a third elongated light-emitting element 128 extending transversely to elements 126 and 127, and a fourth light-emitting element 129 extending substantially parallel to light-emitting element 128. Second alignment pattern 124 is generated by energizing an adjacent pair of light-emitting elements 132 and 134.

Second alignment pattern 124 has a free end 140 extending outwardly of first alignment pattern 122 as viewed on screen 116. Free end 140 corresponds to a free end 122 of light-emitting element 132. Such free ends 140 and 142 are illustrated for purposes of explaining the invention, and neither free end 140 nor 142 is necessary to the invention. For example, a person having ordinary skill in the art would readily understand that free end 140 could be omitted from screen 116 with appropriate software commands. Likewise, free end 142 could be hidden, as viewed from above, by use of an unillustrated opaque barrier, or by positioning free end 142 differently with respect to a viewer's line of sight.

A light source 150 is optically connected at free ends of light-emitting elements 128 and 129, for example. A further light source 154 is likewise optically connected at free ends of light-emitting strands 126, 127, 132, and 134, for example. An electronic control link 158 connects light sources 150 and 154 to computer 104.

It is contemplated that individual light-emitting elements be selectively illuminated, and that each individual light-emitting element emit light of a different color, as dictated by the user.

FIG. 5

Figure 5:
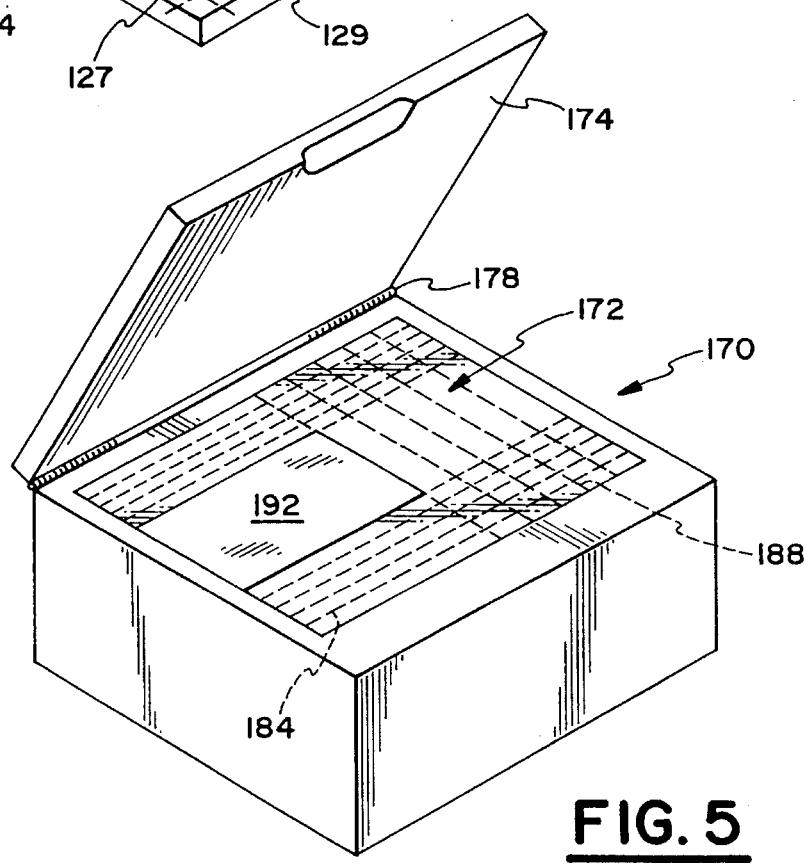
FIG. 5 is a perspective view of a still further preferred embodiment of a light board in combination with a photocopy machine, according to the invention; and, FIG. 6 is a side view of a duplicating apparatus including a light board and a wave energy image projecting device used with a duplicating apparatus according to the invention.

FIG. 5 illustrates yet another preferred embodiment of the invention.

A photocopy machine 170 incorporates a light board 172 as part of the working surface of photocopying machine 170. Copy machine 170 may be provided with a conventional lid 174 rotatably attached by one or more hinges 178 for movement between the illustrated opened position and an unillustrated closed position substantially covering light board 172.

Light board 172 includes a plurality of longitudinally extending light-emitting strands 184 and a plurality of strands 188 extending transversely to longitudinal strands 184. Typically, transverse strands 188 will extend substantially perpendicularly to longitudinal strands 184. The pluralities of longitudinal strands 184 and transverse strands 188 comprise the alignment grid which will be use to align objects on the upper work surface of light board 172 in a fashion similar to the use of the other embodiments according to the invention. It will be readily appreciated that objects, such as components of a layout, will face downwardly when photocopy machine 170 is used to make a duplicate copy of the components of the layout, given that conventional duplicating means are disposed below light board 172.

An object 192, such as a layout to be duplicated, is shown disposed on the upper surface of light board 172, aligned with selected ones of longitudinal light-emitting strands 184 and light-emitting strands 188. Layout 192 is disposed facing downwardly; i.e., the subject matter to be duplicated on layout 192 faces the upper surface of light board 172.

Selected ones of longitudinal and transverse light-emitting strands 184 and 188 are lighted, and the control thereof is governed by dedicated electronics within photocopy machine 170 and/or an electronic hookup to a computer, such as described regarding FIG. 4 above.

Likewise, it is contemplated that the lighted array defined by transverse and longitudinal light-emitting strands 184 and 188 will be turned off prior to the initiation of the duplicating process. The step of turning off light-emitting strands 184 and 188 will be done manually, or automatically, using automatic controls such as described in parent application Ser. No. 08/418,677, filed Apr. 7, 1995, which is incorporated herein by reference.

FIG. 6

Figure 6:
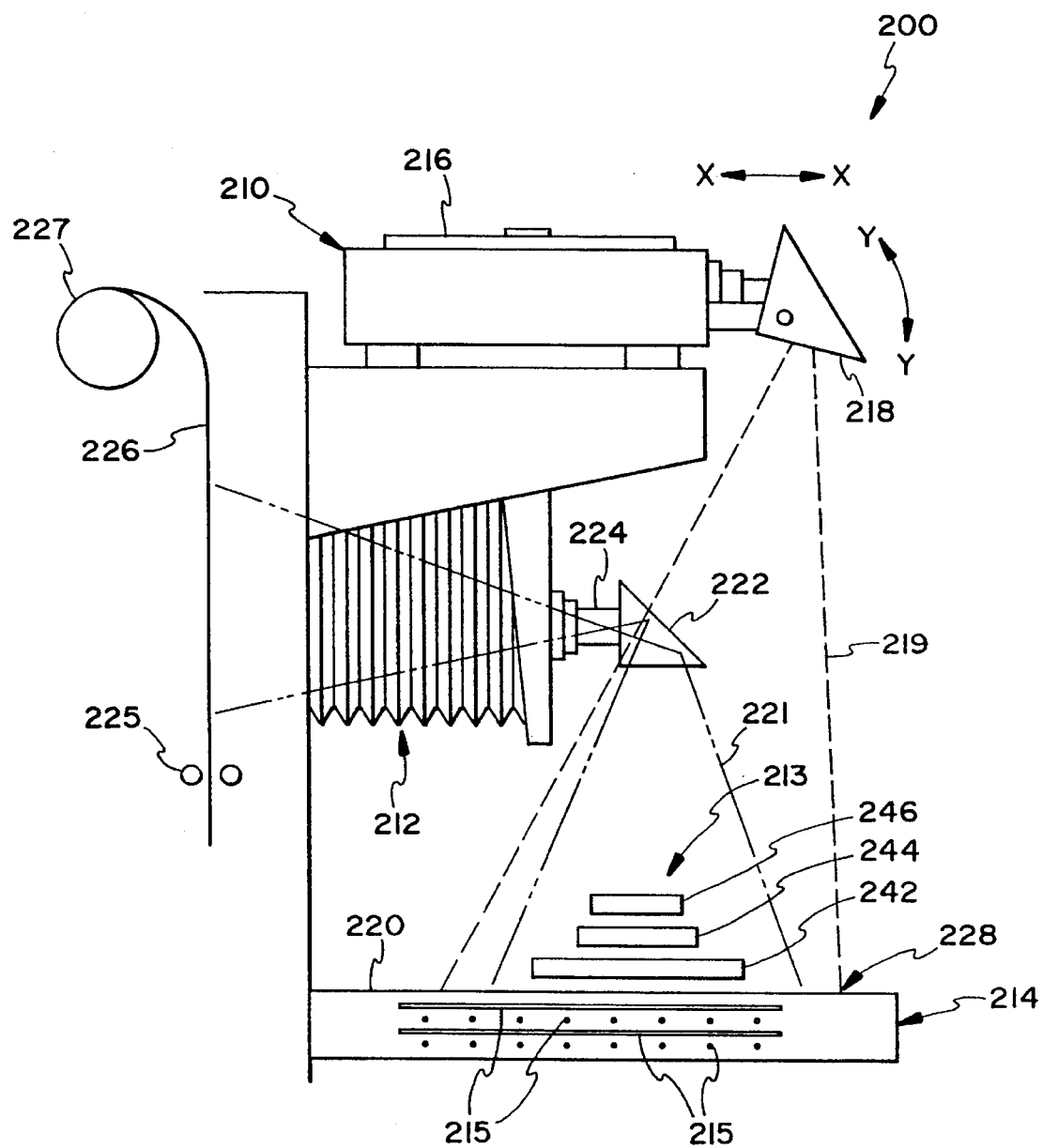

FIG. 6 illustrates another preferred embodiment of a system 200 of the present invention for quickly and accurately aligning and photo duplicating a layout.

System 200 includes a projecting device 210, described in detail in application Ser. No. 08/418,677, a photo duplicating device 212 and a subject holder or copy board 214 or the like. Projecting device 210 is removably positioned on the top of photo duplicating device 212. Copy board 214 is positioned below both projecting device 210 and photo duplicating device 212.

It is contemplated to be within the scope of this invention that various types of photo duplicating devices such as video cameras or film cameras may be used.

Copy board or light board 214 includes a plurality of longitudinal and transverse light-emitting elements 215 defining an alignment pattern as in the other preferred embodiments of the invention. Light board 214 is oriented in a manner similar to the orientation of light board 10 as shown in FIG. 3.

Copy boards 214 may include permanent reference marks which are used to orient a projected alignment pattern 228 onto copy board 214, as described in detail in application Ser. No. 08/418,677. Projected alignment pattern 228 is useful for aligning objects and layouts on opaque backings, and in situations in which both an illuminated alignment pattern below the layout is used in connection with a projected alignment pattern 228.

Projecting device 210 may include a magazine or carousel 216 for holding multiple alignment patterns which are to be projected upon copy board 214. Projecting device 210 also may include an adjustable prism 218 for orienting or positioning the projected image of alignment pattern 228 onto copy board 214.

Carousel 216 allows multiple alignment patterns to be inserted into projecting device 210 giving the user the option of a variety of alignment patterns to be projected onto the surface 220 of copy board 214.

The image projection path 219 of projecting device 210 preferably should be broad enough to encompass the entire focal path 221 of photo duplicating device 212. Such ensures that a layout 213 when placed within focal path 221 can be properly aligned using projected alignment pattern 228.

Photo duplicating device 212 may be a bellow type camera with prism 222 attached to lens 224 for transmitting and focusing the image of layout 213 to be duplicated onto the photographic medium or film 226.

As illustrated, the position of projecting device 210, when mounted on photo duplicating device 212, can be adjusted along a path X—X permitting further adjustment of the image of alignment pattern 228 projected onto the surface 220 of copy board 114.

Photographic medium or film 226 is shown as a spool type film. Rollers 225 engage film 226 to properly position film 226 with respect to the camera 212. Spool 227 is used to advance film 226 for a new shot to be taken.

Projecting device 210 and photo duplicating device 212 can be operably interconnected by signal or frequency generating equipment or mechanical linkages (not shown), so that photo duplicating device 212 will not operate until projecting device 210 is cut off either manually or automatically by the activation of photo duplicating device 212.

Likewise, the light grid defined by light-emitting strands 215 may be operably interconnected so that photo duplicating device 212 will operate only when the light grid is turned off.

The alignment of layout elements 242, 244, and 246 is achieved quickly as will be readily appreciated; the alignment thereof will be further described below.

Operation

FIGS. 1–3

In operation, light board 10 will have its alignment pattern 20 illuminated by activating the light source(s) for the respective ones of first and second pluralities of light-emitting elements 24 and 28.

When a grid of substantially transversely extending guidelines is desired, the user activates appropriate ones of first and second pluralities of light-emitting elements 24 and 28.

After the desired grid or pattern is established, the user places the first layout element on upper support surface 34 of translucent substrate 32. The first layout element is aligned, as required. Typically, the first layout element will be substantially transparent, and the intensity of the light emitted by light-emitting elements 24 and 28 will be selected so that the light emitted thereby may be seen by the user through one or more layers of such transparent layout elements.

After the first layout element has been aligned, additional layout elements may be placed adjacent thereto, and likewise aligned.

When the desired layout is completed, first and second pluralities of light-emitting elements 24 and 28 will typically be dimmed or turned off completely. Then, a copy of the layout will be made using conventional duplicating equipment.

FIG. 4

Light board 100 shown in FIG. 4 is used in a manner similar to the operation of light board 10 of FIG. 1. In addition, the preferred embodiment of FIG. 4 includes computer 104 for controlling which ones of first and second elongated light-emitting elements 126 and 128 are illuminated.

As illustrated, the user has input commands by use of keyboard 108 to cause selected ones of the light-emitting elements to be illuminated; namely elongated light-emitting elements 126, 127, 123, 129, 132, and 134 are illuminated. Additional visual feedback may be provided to the user by having the desired alignment pattern likewise displayed on the screen 116 of computer 104, such as shown by corresponding first and second alignment patterns 122 and 124.

Layout elements are placed on light board 100, aligned, and duplicated, in a manner similar to that described with reference to FIGS. 1–3 above.

FIG. 5

The embodiment of FIG. 5 is used in a manner similar to the operation of a conventional photocopy machine, with the added benefit of light board 172 disposed adjacent to or forming a part of the working surface of photocopy machine 170.

The user opens lid 174 by upward rotation thereof, as viewed in FIG. 5, and selects the desired alignment grid defined by longitudinal strands 184 and transverse strands 188. Object 192 is placed on the working surface of photocopy machine 170, and aligned with the corresponding alignment pattern. Typically, object 192 will be a layout component in a form of an opaque original or a transparency, the face of which will face downwardly for being copied by the conventional duplicating means present in photocopy machine 170.

As required, light-emitting strands 184 and 188 will be dimmed or turned off prior to activation of the duplicating means. Lid 174 will typically be rotated downwardly to cover object 192 and the working surface of photocopy machine 170, as is generally done when using a conventional photocopy machine. As described above, when light-emitting strands 184 and 188 are turned off prior to duplication of object 192, the step of turning off light-emitting strands 184 and 188 may be carried out automatically upon sending the duplicating request to the duplicating machine.

Referring now to FIG. 6, when a projected alignment pattern 228 is desired, alignment pattern members are inserted into carousel 216. A desired alignment pattern member is then selected and projected onto copy board 214. Alignment pattern 228 is then aligned with reference marks on the surface 220 of copy board 214. This is done by adjusting prism 218 along path Y—Y and adjusting the position of projection device 210 along path X—X.

Once the image of alignment pattern 228 has been aligned, the layout is then placed on surface 220 of copy board 214 and then is properly aligned with alignment pattern 228.

Once the layout has been properly aligned, alignment pattern 228 is removed from copy board 214 by shutting off projecting device 210. Then an image of the layout is recorded on film 226.

When an illuminated alignment pattern is desired, such as when a transparency 242 is used, light board 214 is turned on. When light board 214 is activated to illuminate light-emitting strands 215, illuminated strands 215 may likewise serve as reference marks for aligning projected alignment pattern In the case where layout elements 242, 244, and 246 are all substantially transparent, except for the design to be duplicated, the alignment grid defined by illuminated strands 215 will typically suffice to achieve proper alignment.

When layout element 244 is opaque and layout element 246 is substantially transparent, projected alignment pattern 228 may be used to align layout element 246 relative to the other layout elements 242, and 244.

It is likewise contemplated that the various embodiments described above be multiplied and/or combined together, as needs dictate. For example, it is expected that the photo duplicating device 212 and/or the projecting device 210 for projecting alignment patterns be used in conjunction with the photocopy machine embodiment of FIG. 5 to provide even greater flexibility as to the manner in which my invention is used.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

I claim:

1. A light board, comprising:
    a) a substantially translucent support defining a support surface thereon;
    b) an alignment pattern generator disposed adjacent said support for establishing an alignment pattern visible from above said support surface;
    c) said alignment pattern generator including a plurality of light-emitting elements; and,
    d) said alignment pattern generator including:
        i) a first set of light-emitting element for emitting a first color of light; and
        ii) a second set of light-emitting element for emitting a second color of light differing from said first color of light.
2. A light board as in claim 1, wherein:
    a) said first set of light-emitting elements extends transversely to said second set of light-emitting elements.
3. A light board as in claim 1, wherein:
    a) one of said first and second sets is superimposed on the other one of said first and second sets.
4. A light board as in claim 1, wherein:
    a) said plurality of light-emitting elements includes fiber optic material.
5. A light board as in claim 1, wherein:
    a) said first and second sets of light-emitting elements include a plurality of cooperating units.
6. A light board as in claim 5, wherein:
    a) said plurality of units is stacked.
7. A light board as in claim 1, wherein:
    a) said plurality of light-emitting elements includes fiber optic material.
8. Duplicating apparatus for quickly and accurately aligning a layout to be duplicated including:
    a) means provided for duplicating an image;
    b) a light board having an upper work surface for receiving a layout to be aligned and duplicated;
    c) means provided for generating an alignment pattern;
    d) said alignment pattern generating means including a plurality of light-emitting elements; and
    e) said duplicating means including means positioned adjacent said upper work surface of said light board for duplicating an image of the layout.
9. Duplicating apparatus as in claim 8, wherein:
    a) said duplicating means includes a camera.
10. Duplicating apparatus as in claim 8, wherein:
    a) said light board includes means for adjusting the intensity of said light-emitting elements.
11. Duplicating apparatus as in claim 8, wherein:
    a) means is provided for interconnecting said alignment pattern generating means with said duplicating means for causing said plurality of light-emitting elements to emit a reduced amount of light when said duplicating means is operating.

12. Duplicating apparatus as in claim 8, wherein:

a) said duplicating means includes a photocopy machine.

13. Duplicating apparatus as in claim 8, wherein:

a) means is provided above said light board upper work surface for projecting a wave energy image of an auxiliary alignment pattern onto said upper work surface.

14. Duplicating apparatus as in claim 13, wherein:

a) means is provided for interconnecting said means for projecting a wave energy image of an auxiliary alignment pattern with said duplicating means for causing a reduced level of wave energy to be projected when said duplicating means is operating.

15. A method for quickly and accurately aligning a layout, comprising the steps of:

a) providing a light board including:
   i) a substantially translucent support defining a support surface thereon;
   ii) an alignment pattern generator disposed adjacent said support for establishing an alignment pattern; and
   iii) said alignment pattern generator including a plurality of light-emitting elements;
b) establishing an alignment pattern by activating the alignment pattern generator;
c) placing a layout to be duplicated onto the support surface thereof;
d) aligning the layout with the alignment pattern; and
e) duplicating the aligned layout.

16. A method as recited in claim 15, further comprising the step of:

a) controlling the light board by a computer.

17. A light board, comprising:

a) a substantially translucent support defining a support surface thereon;
b) an alignment pattern generator disposed adjacent said support for establishing an alignment pattern visible from above said support surface;
c) said alignment pattern generator including a plurality of light-emitting elements, and;
d) said alignment pattern generator including a computer for controlling the Configuration of the alignment pattern established.

18. A light board, comprising:

a) a substantially translucent support defining a support surface thereon;
b) an alignment pattern generator disposed adjacent said support for establishing an alignment pattern visible from above said support surface;
c) said alignment pattern generator including a plurality of light-emitting elements, and;
d) said plurality of light-emitting elements including elongated strands.

19. A light board, comprising:

a) a substantially translucent support defining a support surface thereon;
b) an alignment pattern generator disposed adjacent said support for establishing an alignment pattern visible from above said support surface;
c) said alignment pattern generator including a plurality of light-emitting elements, and;
d) said plurality of light-emitting elements including fiber optic material.

20. A light board, comprising:

a) a substantially translucent support defining a support surface thereon;
b) an alignment pattern generator disposed adjacent said support for establishing an alignment pattern visible from above said support surface;
c) said alignment pattern generator including a plurality of light-emitting elements, and;
d) said alignment pattern generator being disposed within said translucent support.

21. A light board as in claim 20, wherein:

a) said plurality of light-emitting elements includes fiber optic material.

\* \* \* \* \*